(12) United States Patent
Joshi et al.

(10) Patent No.: US 10,035,095 B2
(45) Date of Patent: Jul. 31, 2018

(54) DIVERTED PULSE JET CLEANING DEVICE AND SYSTEM

(71) Applicant: General Electric Company, Schenectady, NY (US)

(72) Inventors: Ameya Chandrakant Joshi, Greenville, SC (US); Bradly Aaron Kippel, Greer, SC (US)

(73) Assignee: General Electric Company, Schenectady, NY (US)

( * ) Notice: Subject to any disclaimer, the term of this patent is extended or adjusted under 35 U.S.C. 154(b) by 233 days.

(21) Appl. No.: 15/060,658

(22) Filed: Mar. 4, 2016

(65) Prior Publication Data
US 2017/0252689 A1 Sep. 7, 2017

(51) Int. Cl.
*B01D 46/00* (2006.01)
*B01D 46/42* (2006.01)
*B01D 46/24* (2006.01)

(52) U.S. Cl.
CPC ....... *B01D 46/0068* (2013.01); *B01D 46/002* (2013.01); *B01D 46/2403* (2013.01); *B01D 46/4272* (2013.01)

(58) Field of Classification Search
CPC ............. B01D 46/24–46/2403; B01D 46/4272
USPC ................................... 55/282–305
See application file for complete search history.

(56) References Cited

U.S. PATENT DOCUMENTS

| | | | |
|---|---|---|---|
| 4,278,454 A | 7/1981 | Nemesi | |
| 4,402,553 A * | 9/1983 | Hipps | B60T 15/028 188/3 R |
| 4,818,261 A | 4/1989 | Beckon | |
| 4,971,026 A | 11/1990 | Fineblum | |
| 5,281,246 A | 1/1994 | Ray et al. | |
| 5,533,706 A * | 7/1996 | Aurell | B01D 46/0068 251/30.05 |
| 6,368,386 B1 | 4/2002 | Nelson et al. | |
| 6,716,274 B2 | 4/2004 | Gogins et al. | |
| 6,743,273 B2 | 6/2004 | Chung et al. | |
| 6,875,256 B2 | 4/2005 | Gillingham et al. | |
| 6,994,742 B2 | 2/2006 | Barris et al. | |
| 7,008,465 B2 | 3/2006 | Graham et al. | |
| 7,070,640 B2 | 7/2006 | Chung et al. | |
| 7,179,317 B2 | 2/2007 | Chung et al. | |

(Continued)

FOREIGN PATENT DOCUMENTS

| | | |
|---|---|---|
| EP | 0 255 613 A2 | 6/1987 |
| EP | 1733776 A2 | 12/2006 |

(Continued)

OTHER PUBLICATIONS

Extended European Search Report and Opinion issued in connection with corresponding EP Application No. 17157811.5, dated Jul. 11, 2017.

Primary Examiner — T. Bennett McKenzie
(74) Attorney, Agent, or Firm — Dority & Manning, P.A.

(57) ABSTRACT

A pulse jet cleaning system is disclosed having at least one diverter device and having at least one control valve configured for receiving pulse air from a pulse air manifold and controllably passing a pulse of pulse air downstream to clean the filter assemblies. The at least one diverter is configured for receiving the pulse from the control valve and diverting the pulse into a plurality of outlet ports for providing pulse air to at least two blowpipes for cleaning a filter assembly.

18 Claims, 6 Drawing Sheets

(56) References Cited

U.S. PATENT DOCUMENTS

| | | |
|---|---|---|
| 7,270,692 B2 | 9/2007 | Gillingham et al. |
| 7,270,693 B2 | 9/2007 | Chung et al. |
| 7,316,723 B2 | 1/2008 | Chung et al. |
| 7,648,564 B2 | 1/2010 | Chillar et al. |
| 8,029,588 B2 | 10/2011 | Chung et al. |
| 8,057,563 B2 | 11/2011 | Raether |
| 8,057,582 B2 | 11/2011 | Raether |
| 8,114,196 B2 | 2/2012 | Lamee |
| 8,118,900 B2 | 2/2012 | Raether et al. |
| 8,167,980 B2 | 5/2012 | Hiner et al. |
| 8,182,587 B2 | 5/2012 | Hiner et al. |
| 8,292,981 B2 | 10/2012 | Sithes |
| 8,349,044 B2 | 1/2013 | Raether |
| 8,366,797 B2 | 2/2013 | Chung et al. |
| 8,475,115 B2 | 7/2013 | Zhang et al. |
| 8,709,118 B2 | 4/2014 | Chung et al. |
| 8,715,384 B2 | 5/2014 | Saraswathi et al. |
| 8,894,356 B2 | 11/2014 | Lafontaine et al. |
| 2002/0073667 A1 | 6/2002 | Barris et al. |
| 2003/0089234 A1* | 5/2003 | Bjarno ............... B01D 46/0068 95/280 |
| 2003/0106294 A1 | 6/2003 | Chung et al. |
| 2004/0123572 A1 | 7/2004 | Chung et al. |
| 2005/0252178 A1 | 11/2005 | Richard |
| 2007/0012007 A1 | 1/2007 | Chung et al. |
| 2008/0022855 A1 | 1/2008 | Clements |
| 2008/0127826 A1 | 6/2008 | Raether |
| 2011/0067369 A1 | 3/2011 | Chung et al. |
| 2011/0185689 A1 | 8/2011 | Raether et al. |
| 2012/0204527 A1 | 8/2012 | Chung et al. |
| 2013/0048265 A1 | 2/2013 | Desai et al. |
| 2013/0092028 A1* | 4/2013 | Zhang ............... B01D 46/0069 95/282 |
| 2013/0199192 A1 | 8/2013 | Zhang et al. |
| 2013/0199202 A1 | 8/2013 | Zhang et al. |
| 2014/0047980 A1 | 2/2014 | Raether |
| 2015/0182895 A1 | 7/2015 | Bansal et al. |
| 2015/0182898 A1 | 7/2015 | Bansal et al. |
| 2015/0182899 A1 | 7/2015 | Bansal et al. |
| 2015/0182901 A1 | 7/2015 | Bansal et al. |
| 2015/0238889 A1 | 8/2015 | Shellenberger |

FOREIGN PATENT DOCUMENTS

| | | |
|---|---|---|
| EP | 1795249 A1 | 6/2007 |
| EP | 1795250 A1 | 6/2007 |
| EP | 1820553 A2 | 8/2007 |
| EP | 1925352 A1 | 5/2008 |
| EP | 2 835 564 A1 | 2/2015 |
| EP | 1820553 B1 | 7/2015 |
| EP | 1925352 B1 | 7/2015 |

* cited by examiner

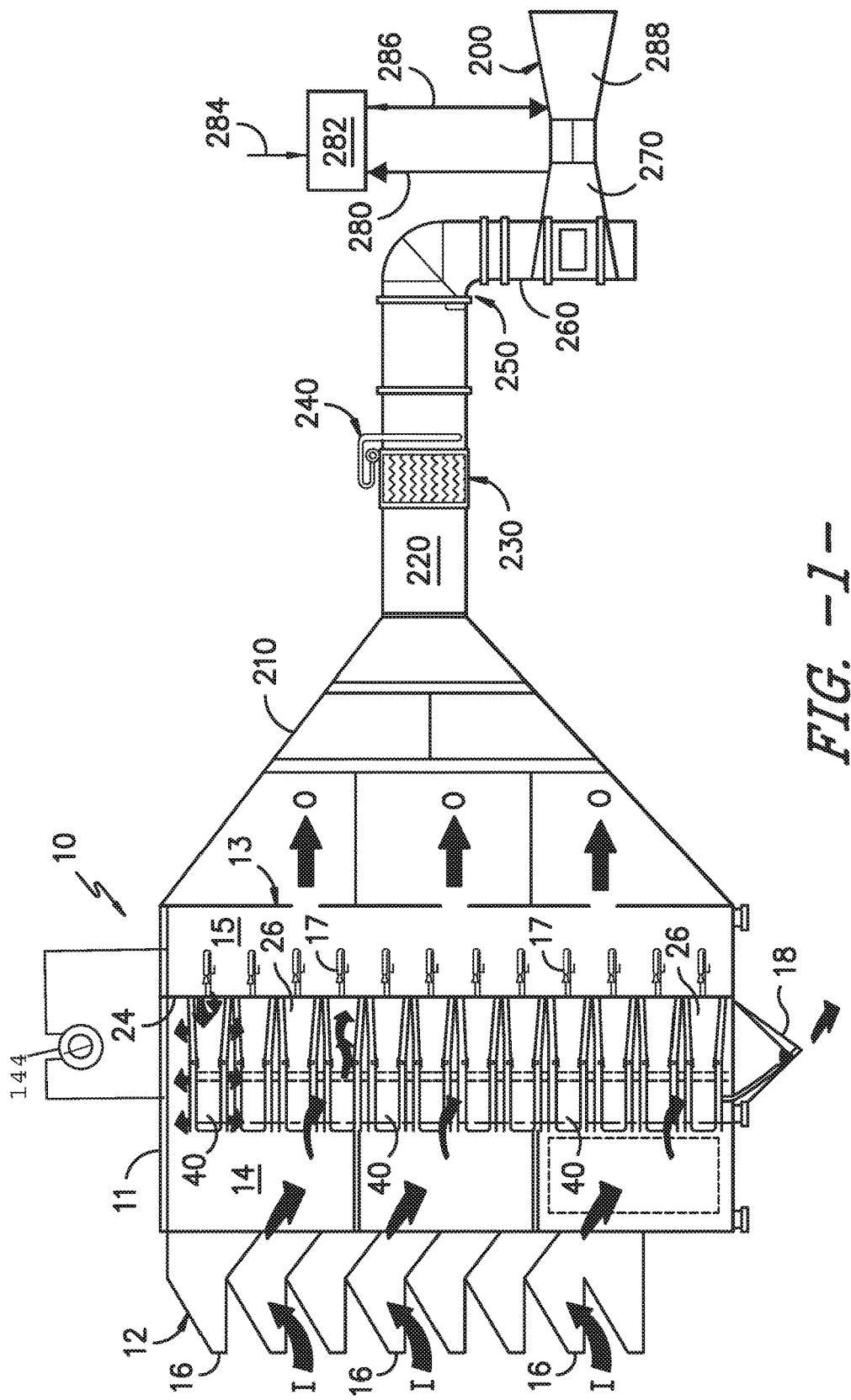
FIG. -1-

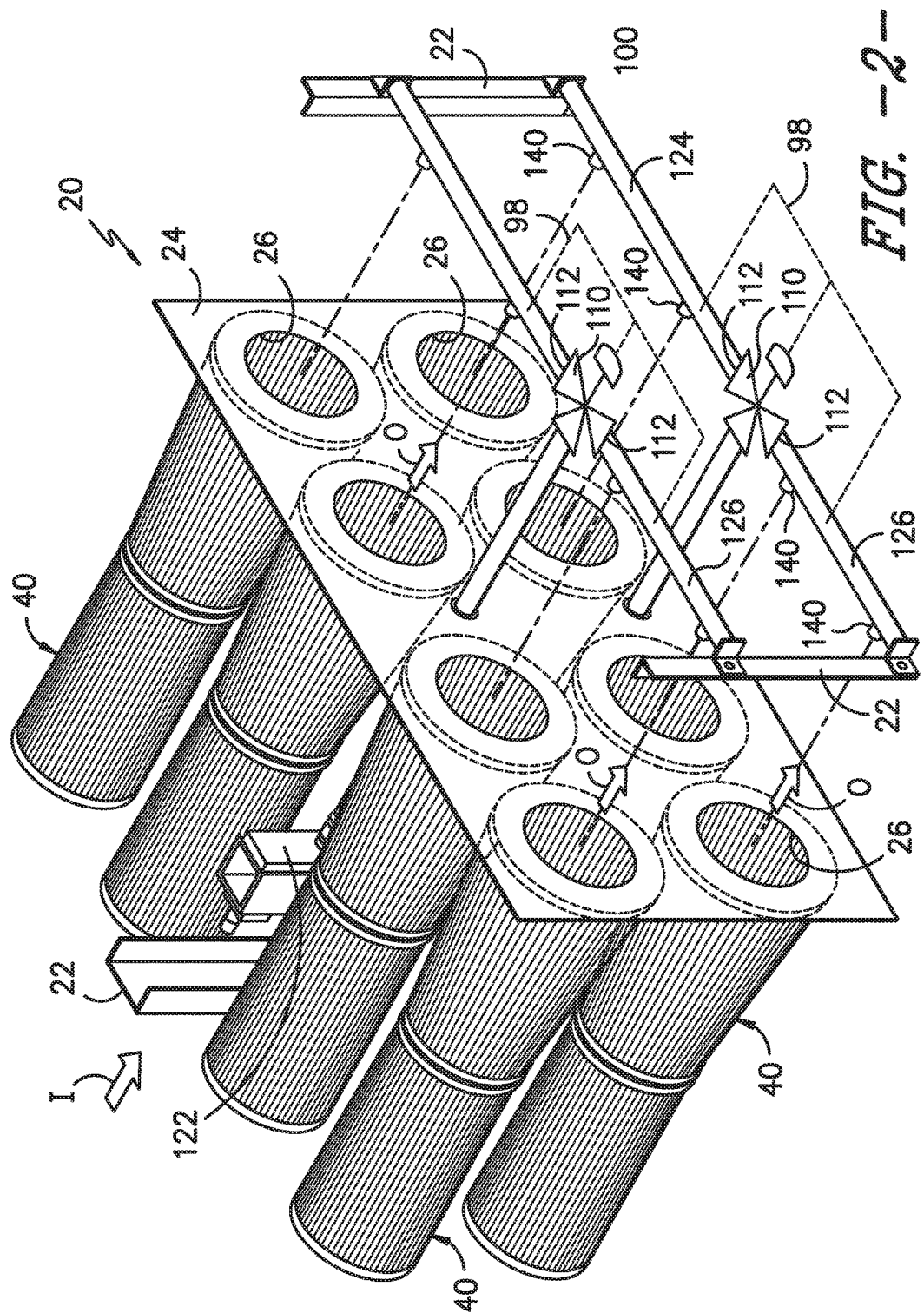

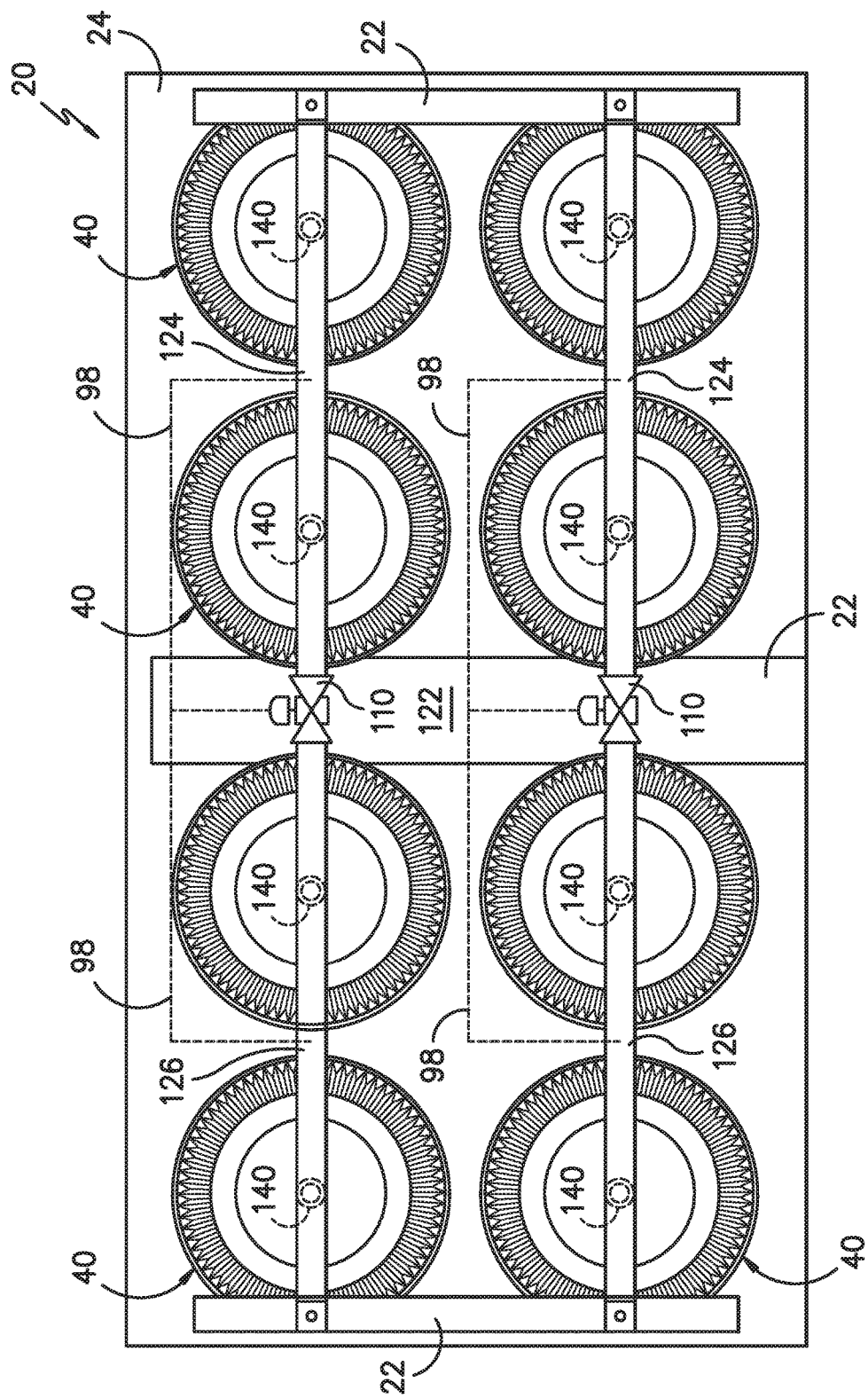

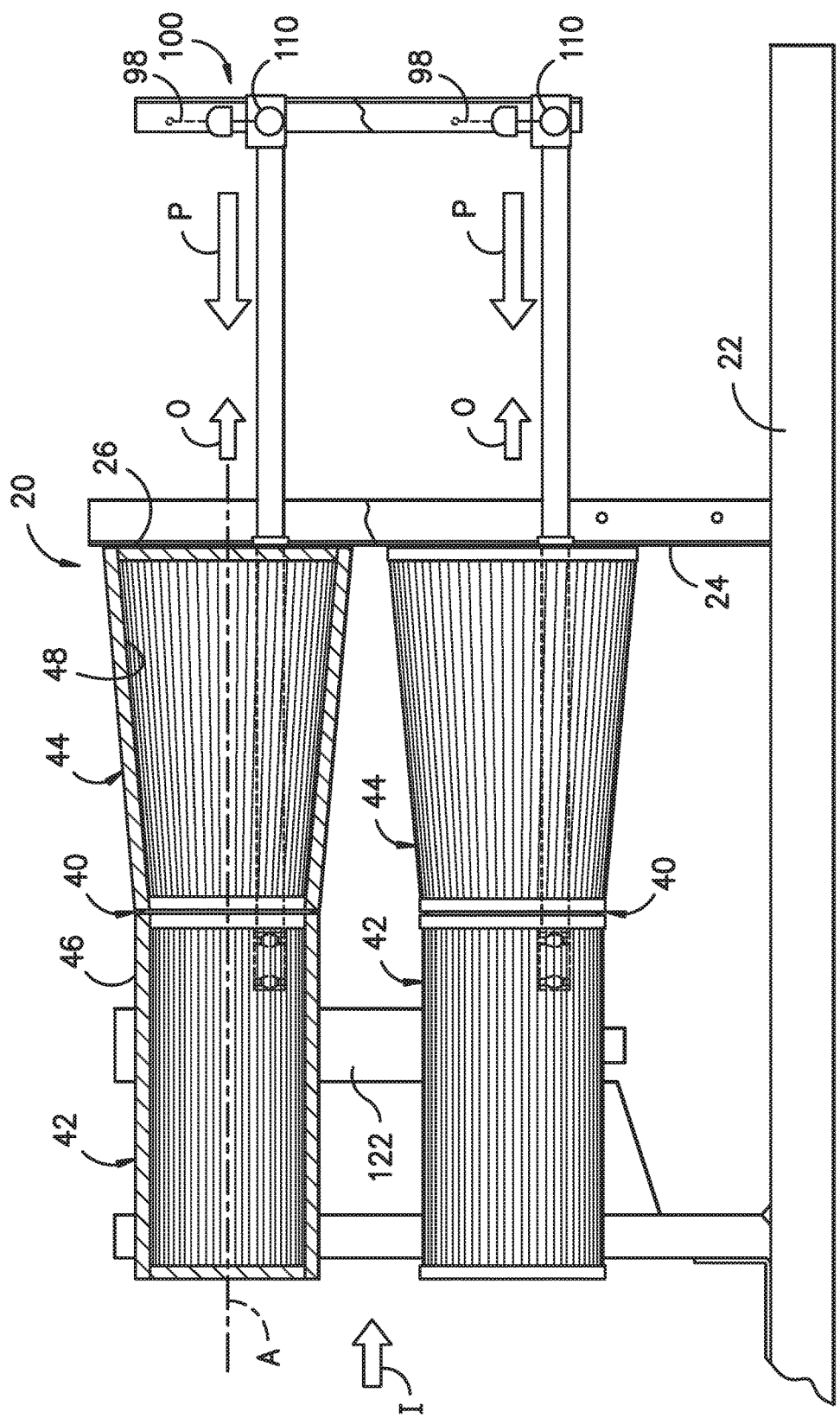
FIG. -4-

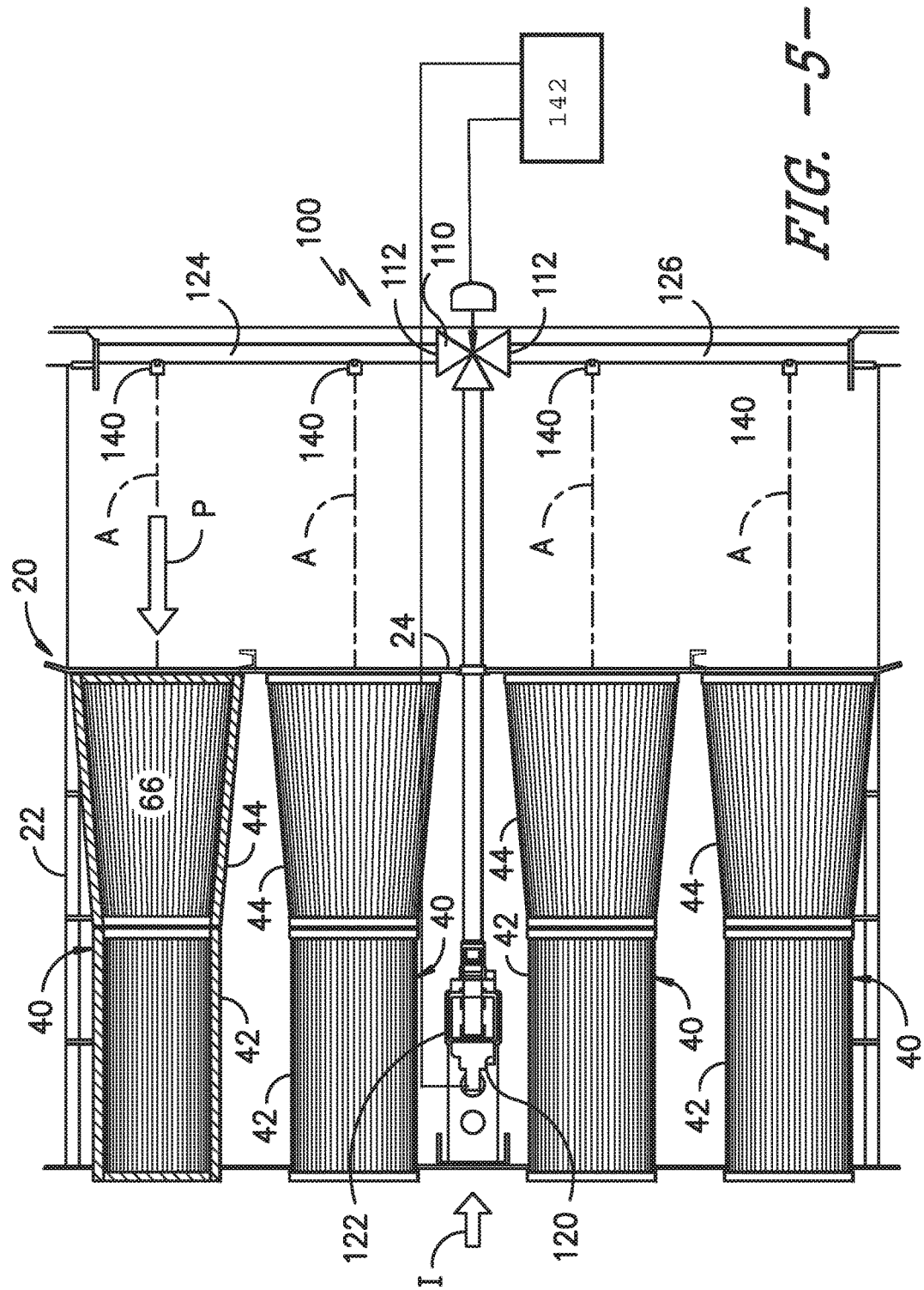
FIG. -5-

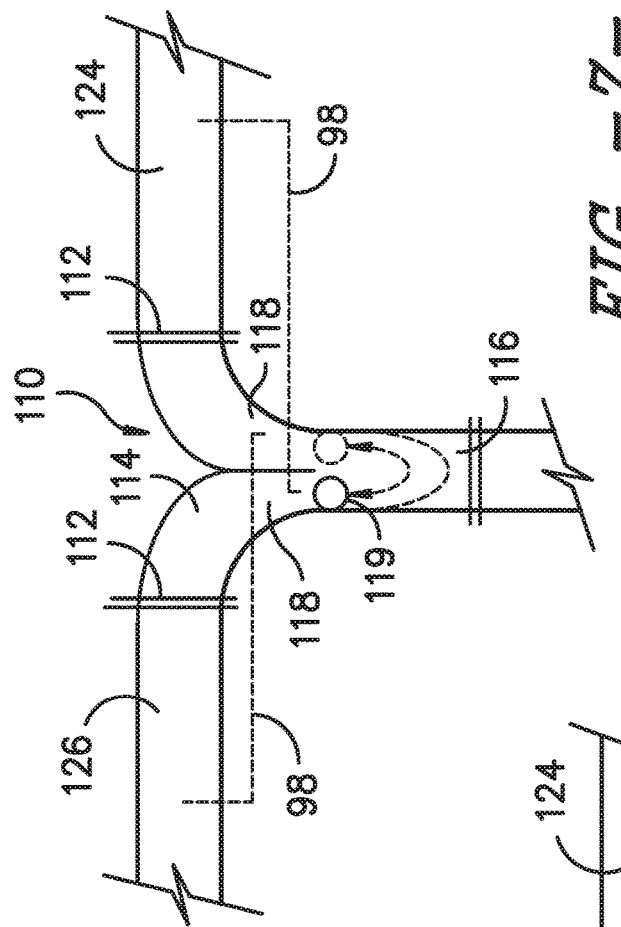
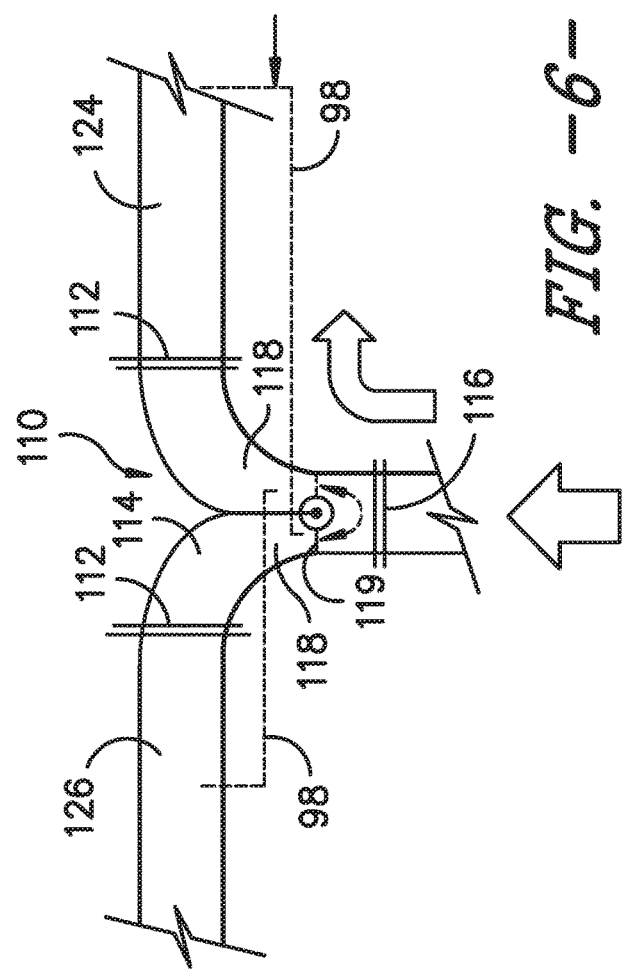

DIVERTED PULSE JET CLEANING DEVICE AND SYSTEM

FIELD OF THE DISCLOSURE

This disclosure relates to pulse jet cleaning systems, and more specifically to a diverter device and system that reduces the number of pulse jet control valves and associated services for a given filter configuration.

BACKGROUND OF THE DISCLOSURE

In a pulse jet filter cleaning system, the dust is collected on the filter media and when the cake of dust is of appropriate thickness and structure to cause undue pressure drop, a pulse or pulses of compressed air hit or shock the filter media and knock the cake off. This pulse may sometimes be accompanied by physical shaking and even reverse air flows, depending on design. When the cake is removed correctly from the filter, the system removes dust from its assigned environment and has a normal filter life. When the cake is not removed efficiently, the filter life can be significantly shortened.

Pulse jet cleaning systems specify the compressed air inlet pressure to the manifold and pulse valves necessary for effective dust removal. The pulse valve sends a given volume of air to the filter at a predetermined velocity to strike and clear the cake. The actual amount of air is dependent upon the pulse nozzle being fed compressed air at a predetermined and fixed pressure. The cleaning system must receive the correct pressure and a steady repeatable pressure level for each pulse, particularly if timers are used to control the pulses.

A typical pulse jet filter cleaning system uses one control valve to pulse two filters at a time. One row of filters typically consists of four filters per module. Each row thus requires two control valves per row.

BRIEF DESCRIPTION OF THE DISCLOSURE

Aspects and advantages of the disclosure will be set forth in part in the following description, or may be obvious from the description, or may be learned through practice of the disclosure.

A pulse jet cleaning system is disclosed having at least one diverter device and having at least one control valve configured for receiving pulse air from a pulse air manifold and controllably passing a pulse of pulse air from the downstream side of the filter, blowing upstream to clean the filter assemblies. At least one diverter is configured for receiving the pulse from the control valve and diverting the pulse into a plurality of outlet ports for providing pulse air to at least two blowpipes for cleaning a filter assembly.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which:

FIG. 1 is a side view of a typical gas turbine air intake filter system and associated gas turbine equipment.

FIG. 2 is a perspective view, taken from the outlet or downstream side, of a portion of an embodiment of the gas turbine intake filter and diverted cleaning system.

FIG. 3 is a downstream end view of an embodiment of the gas turbine intake filter and diverted cleaning system.

FIG. 4 is a side view of an embodiment of the gas turbine intake filter and diverted cleaning system.

FIG. 5 is a top view of an embodiment of the gas turbine intake filter and diverted cleaning system.

FIG. 6 is an embodiment of the diverter valve for the gas turbine intake filter and diverted cleaning system.

FIG. 7 is another embodiment of the diverter valve for the gas turbine intake filter and diverted cleaning system.

Repeat use of reference characters in the present specification and drawings is intended to represent the same or analogous features or elements of the present disclosure.

DETAILED DESCRIPTION OF THE DISCLOSURE

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Referring to FIG. 1, the air intake system 10 includes a filter chamber 11 having an air inlet side 12 and an air outlet side 13. Air enters the filter chamber 11 through a plurality of vertically spaced inlet hoods 16 positioned along the air inlet side 12. The inlet hoods 16 function to protect internal filters of the air intake system 10 from the effects of rain, snow and sun. The chamber 11 is divided into upstream and downstream volumes 14 and 15 by a tube sheet 24. The upstream volume 14 generally represents the "dirty air section" of the air intake system 10, while the downstream volume 15 generally represents the "clean air section" of the system 10. The tube sheet 24 defines a plurality of openings 26 for allowing air to flow from the upstream volume 14 to the downstream volume 15. Each opening 26 is covered by an air filter assembly 40 or filter cartridge(s) located in the upstream volume 14 of the chamber. The filters 40 are arranged and configured such that air flowing from the upstream volume 14 to the downstream volume 15 passes through the filters 40 prior to passing through the openings 26.

For the particular filter arrangement shown, each air filter assembly 40 includes a pair of filter elements, a cylindrical element and a conical element. Each filter assembly 40 is generally co-axially aligned with respect to its corresponding openings 26 and has a longitudinal axis that is generally horizontal. Other possible filter configurations include; a horizontal axis configuration having 2 conical filters, or 2 cylindrical filters, or 1 conical and/or 1 cylindrical filter; and a vertical axis configuration having 2 conical filters, or 2 cylindrical filters, or 1 conical and/or 1 cylindrical filter. During filtering, air is directed from the upstream volume 14 radially through the air filters 40 into interior volumes of the filters 40. After being filtered, the air flows through the tube sheet 24, via openings 26, into the downstream clean air volume 15. The clean air is then drawn out from the downstream volume 15 into a gas turbine intake, not shown.

Each opening 26 of the partition 24 includes a pulse jet air cleaner 17 mounted in the downstream volume 15. Periodically, the pulse jet air cleaner 17 is operated to direct a pulse jet of air backwardly through the associated air filter 40, i.e. from the interior volume of the filter element outwardly to shake or otherwise dislodge particular material trapped in or on the filter media of the air filter 40. The pulse jet air cleaners 17 can be sequentially operated from the top to the bottom or in a predetermined sequence as defined by controller 142. All filters 40 of the chamber 11 are eventually pulsed and direct the dust particulate material blown from the filters into the lower hopper 18, for removal.

The outlet air O then may flow through a transition piece 210 and an inlet duct 220. A silencer section 230 and an inlet bleed heat system 240 also may be used therein. One or more screens 250 may be used to deflect larger types of contaminates or debris. The flow of outlet air O then may pass through an inlet plenum 260 and into the compressor 270 for compression and combustion. Other configurations and other components may be used herein. The inlet air intake system 10 may be used with a gas turbine engine 200. As is known, the gas turbine engine 200 may include a compressor 270. The compressor 270 compresses an incoming flow of air O and delivers the compressed flow of air 280 to a combustor 282. The combustor 280 mixes the compressed flow of air 280 with a compressed flow of fuel 284 and ignites the mixture to create a flow of combustion gasses 286. The flow of combustion gases 286 is in turn delivered to a turbine 288. The flow of combustion gases 286 drives the turbine 288 so as to produce mechanical work. The gas turbine engine 200 may use natural gas, various types of syngas, and/or other types of fuels.

In FIG. 2, particulate-laden fluid, such as air, is drawn into the gas turbine intake filter system 20 in the direction indicated by the arrow I. The gas turbine intake filter system 20 includes a filter chamber 11 (see FIG. 1) and a frame that is used to support a tube sheet 24. The tube sheet 24 includes a plurality of openings 26. The gas turbine intake filter system 20 includes a plurality of fabric filter assemblies 40 supported by the tube sheet 24. The fabric filter assemblies 40 are mounted adjacent to the openings 26 at an upstream side of the tube sheet 24, as is shown.

Air is cleaned in the fabric filter assemblies 40. The cleaned air flows downstream from the openings 26 in the tube sheet 24 as indicted by arrows O into a downstream volume 15 (see FIG. 1) and into a gas turbine (not shown) for power generation. Each of the illustrated fabric filter assemblies 40 includes at least one filter element 42, 44 positioned to clean the air before it is used by components located downstream of the filter assemblies. Air to be cleaned flows through the filter elements 42, 44. The filter elements 42, 44 are positioned in air flow communication with an opening 26 in the tube sheet 24. The cleaned air will flow through the opening 26 and then to downstream components.

After a period of use, the airside pressure drop 144 across each of the filter assemblies 40 will increase due to the accumulation of particulates separated from the air stream and accumulated on the filter assemblies. These particulates can be harmful to downstream components, such as a gas turbine, if not removed from the air stream. The filter assemblies 40 are periodically cleaned by directing a flow of relatively higher pressure fluid (such as a pulse P of compressed gas illustrated in FIGS. 4-5). The reverse pulse P is directed into the core of each filter assembly 40, essentially in a diverging direction along a longitudinal central axis A of the filter assembly. The reverse cleaning pulse P flows from the downstream side 48 of the filter assembly 40 to the upstream side 46 of the filter assembly 40. This will remove at least some, and preferably a significant amount, of the particulates from the filter assembly 40 and reduce the restriction across the filter assembly 40 caused by particulates separated from the air stream accumulating on or in the fabric filter media.

In addition, the reverse cleaning pulse P can be used for de-icing the air intake system 10 by removing ice accumulation on the filter assembly 40 and other portions of the filter chamber 11. In freezing conditions, ice will accumulate on the filter chamber 11 and filter assembly 40 thereby blocking air passages and causing additional airside pressure drop 144 that reduces airflow through the intake system 10. The controller 142 (see FIG. 5) receives a signal corresponding to the airside pressure drop 144 and activates the reverse pulse-jet cleaning system 100 to pulse the filter assemblies 40 until the airside pressure drop 144 falls below a predetermined value. The controller 142 can sequentially also operate at least one diverter 110 in response to an airside pressure drop 144 across individual filter assemblies.

Referring to FIGS. 2-5, the reverse pulse-jet cleaning system 100 according to one aspect of the disclosure is illustrated. The reverse cleaning pulse P is provided by the cleaning system 100. Directing a pulse P of compressed gas is done periodically into each filter assembly 40 through the downstream surface 48. By "periodic", it is meant that the reverse pulse-jet system 100 can be programmed or can be manually operated such that in desired periods, after a certain length of time or after a certain amount of filter pressure drop is detected in a known manner, there will be a pulse P of compressed gas directed through the downstream surface 48 of the filter assembly 40.

In general, the reverse pulse-jet cleaning system 100 uses a flow of higher pressure fluid, such as pulses P of compressed gas, such as air, to clean the filter assemblies 40. By "pulse", it is meant a flow of fluid at a pressure at least 4 times higher, and preferably at least 4-10 times higher than the pressure of the outlet flow O through filter assembly 40 for a limited time duration. The time duration is generally under 0.5 second, preferably under 0.3 second, and in some cases less than 0.05 second.

As best seen in FIG. 5, the reverse pulse-jet cleaning system 100 includes a plurality of pulse control valves 120. Each valve 120 is operably connected to a compressed air manifold 122 that supplies compressed fluid, such as air. Each of the valves 120 is arranged to direct the compressed fluid through at least one diverter valve 110 that diverts the pulse P into a selected blowpipe 124 and to at least one nozzle 140. Periodically, the valves 120 are operated to allow a pulse P of compressed air to pass through the diverter valves 110 to the nozzles 140, through the openings 26 in the tube sheet 24, and into the filter assemblies 40. The nozzles 140 are positioned a predetermined distance from the tube sheet 24 and located along the axis A of a respective filter assembly 40, or centrally as illustrated in FIG. 2.

The first and second blowpipes 124, 126 can be permanently secured to the tube sheet 24 or frame 22 by a clamp or bracket. The nozzle 140 of the reverse pulse-jet cleaning system 100 is permanently attached to the blowpipe 124, such as by welding. In the illustrated embodiment, the nozzle 140 is a fabricated from a metal tubular member and has a substantially constant circular cross-section extending along its length in a direction parallel to the longitudinal central axis A.

In FIGS. 6 and 7, the diverter valves 110 for the pulse jet cleaning system 100 are configured for receiving a pulse from the control valve 120 and diverting the pulse into a plurality of outlet ports 112 for providing pulse air to at least one blowpipe 124. The diverter valves 110, as seen in FIGS. 6 and 7, have a housing defining a diverter chamber 114, the diverter chamber 114 having a pulse air inlet 116 and a plurality of pulse air outlets 118. A movable plug 119 is positioned in a first position within a first pulse air outlet 118, the plug 119 defining an aperture for selectively controlling pulse air flow through the chamber 114 and into one of the pulse air outlets 118. The plug 119 is movable between the first position and a second position within a second pulse air outlet 118. At least one pilot line 98 extends from the diverter 110 to at least one of a first blowpipe 124 and a second blowpipe 126, the pilot line 98 configured to deliver a portion of the pulse to the diverter 110 for passively moving the plug between the first and second position. One embodiment of the diverter 110 has a biasing element 128, for instance a spring, configured to urge the plug 119 into the first position absent a pulse. The movable plug 119 can be any suitable type for compressed air service such as a flapper or ball. In one embodiment, the diverter 110 is a multi-way diverting valve, such as a compound pressure relief valve, that can be passively operated by the pilot lines 98 or actively operated by an electric, hydraulic or pneumatic actuator. The control valves 120 can be solenoid valves, diaphragm valves, or other valves suitable for compressed air service. The control valves 120 can be actuated by any suitable motive force such as an electrical signal, hydraulic signal or pneumatic signal.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A diverter device for pulse jet cleaning comprising,
a control valve configured for receiving pulse air from a pulse air manifold and controllably passing a pulse of pulse air downstream, and
at least one diverter configured for receiving the pulse from the control valve and diverting the pulse into a plurality of outlet ports for providing pulse air to at least two blowpipes for cleaning a filter assembly, wherein the diverter further comprises,
a housing defining a diverter chamber, the diverter chamber having a pulse air inlet and a plurality of pulse air outlets,
a movable plug positioned in a first position within a first pulse air outlet, the plug defining an aperture for selectively controlling pulse air flow through the chamber and into one of the pulse air outlets, the plug movable between the first position and a second position within a second pulse air outlet, and
at least one pilot line extending from the diverter to at least one of a first blowpipe and a second blowpipe, the pilot line configured to deliver a portion of the pulse to the diverter for passively moving the plug between the first and second position.

2. The diverter device of claim 1, further comprising a biasing element configured to urge the plug into the first position absent a pulse.

3. The diverter device of claim 2, wherein the biasing element comprises a spring.

4. The diverter device of claim 1, wherein the control valve is selected from at least one of the group consisting of solenoid valve and diaphragm valve.

5. The diverter device of claim 1, wherein the control valve is actuated by at least one of the group consisting of electrical signal, hydraulic signal and pneumatic signal.

6. The diverter device of claim 1, wherein the movable plug is selected from at least one the group consisting of flapper and ball.

7. The diverter device of claim 1, wherein the diverter comprises a multi-way diverting valve.

8. The diverter device of claim 7, wherein the multi-way diverting valve is actively operated by at least one of the group consisting of electrical signal, hydraulic signal and pneumatic signal.

9. The diverter device of claim 1, further comprising a controller to sequentially operate the at least one diverter in response to an airside pressure drop across the filter assembly.

10. A pulse jet filter cleaning system comprising,
a filter chamber comprising, a pulse air manifold,
a plurality of control valves configured for receiving pulse air from the pulse air manifold and controllably passing a pulse of pulse air downstream, and
at least one diverter configured for receiving the pulse from one of the control valves and diverting the pulse into a plurality of outlet ports for providing pulse air to at least two blowpipes for cleaning a filter assembly, wherein the diverter further comprises,
a housing defining a diverter chamber, the diverter chamber having a pulse air inlet and a plurality of pulse air outlets,
a movable plug positioned in a first position within a first pulse air outlet, the plug defining an aperture for selectively controlling pulse air flow through the chamber and into one of the pulse air outlets, the plug movable between the first position and a second position within a second pulse air outlet, and
at least one pilot line extending from the diverter to at least one of a first blowpipe and a second blowpipe, the pilot line configured to deliver a portion of the pulse to the diverter for passively moving the plug between the first and second position.

11. The cleaning system of claim 10, further comprising a biasing element configured to urge the plug into the first position absent a pulse.

12. The cleaning system of claim 11, wherein the biasing element comprises a spring.

13. The cleaning system of claim 10, wherein the plurality of control valves is selected from least one of the group consisting of solenoid valve and diaphragm valve.

14. The cleaning system of claim 10, wherein the plurality of control valves are actuated by at least one of the group consisting of electrical signal, hydraulic signal and pneumatic signal.

15. The cleaning system of claim 10, wherein the movable plug is selected from at least one the group consisting of flapper and ball.

16. The cleaning system of claim 10, wherein the diverter comprises a multi-way diverting valve.

17. The cleaning system of claim 16, wherein the multi-way diverting valve is actively operated by at least one of the group consisting of electrical signal, hydraulic signal and pneumatic signal.

18. The cleaning system of claim 10, further comprising a controller to sequentially operate the at least one diverter in response to an airside pressure drop across the filter assembly.

* * * * *